United States Patent [19]

Smithey

[11] 3,986,964

[45] Oct. 19, 1976

[54] METHOD OF WELL DRILLING AND COMPOSITION THEREFOR

[75] Inventor: Cecil M. Smithey, Houston, Tex.

[73] Assignee: Texas Brine Corporation, Houston, Tex.

[22] Filed: June 11, 1973

[21] Appl. No.: 368,568

[52] U.S. Cl. .............................. 252/8.5 A; 175/65; 175/72; 252/8.5 C
[51] Int. Cl.² ........................................ C09K 7/02
[58] Field of Search .................. 252/8.5 A, 8.5 C; 175/65, 72

[56] References Cited
UNITED STATES PATENTS

| | | | |
|---|---|---|---|
| 3,243,000 | 3/1966 | Patton et al. | 252/8.5 X |
| 3,319,715 | 5/1967 | Parks | 252/8.5 X |
| 3,699,042 | 10/1972 | Browning et al. | 252/8.5 |

FOREIGN PATENTS OR APPLICATIONS

| | | | |
|---|---|---|---|
| 1,063,686 | 3/1967 | United Kingdom | 252/8.5 |

Primary Examiner—Herbert B. Guynn
Attorney, Agent, or Firm—J. Edward Hess; Donald R. Johnson; Stanford M. Back

[57] ABSTRACT

A non-damaging well drilling fluid contains a polysaccharide, a lignosulfonate, chrome sulfate, a pH modifier and, preferably, graded calcium carbonate and starch. The fluid is effective to seal off the well bore essentially immediately and is non-damaging in that it causes little permanent plugging of the formation by loss of the drilling fluid solids to the formation.

18 Claims, No Drawings

3,986,964

METHOD OF WELL DRILLING AND COMPOSITION THEREFOR

BACKGROUND OF THE INVENTION

The use of drilling fluids in drilling oil and other subterranean wells is well known and numerous drilling fluids have been proposed heretofore. A drilling fluid serves a multiplicity of functions. It must have a high enough viscosity to carry the cuttings to the surface and have a low viscosity under the high shear condition at the drill bit to keep power requirements low.

One of the most important functions of a drilling fluid is to seal off the face of the well bore so that the fluid is not lost to the formation being drilled. Ideally this is accomplished by depositing a thin film of the solids in the fluid over the surface of the borehole without any loss of solids to the formation. In other words the drilling fluid solids bridge over the formation pores rather than permanently plugging the pores. Unfortunately most known drilling fluids are damaging fluids in that in effectively sealing off the borehole they permanently plug the formation to a certain extent in the area surrounding the borehole. Consequently when oil is subsequently obtained from the formation the flow thereof is reduced to the extent of the pluggage which occurred by the drilling fluid solids. An ideal drilling fluid, from the standpoint of formation damage would be one which upon flow through a formation or test core in one direction sealed the core almost immediately and upon flow in the other direction or backflow showed no reduction in the original permeability of the core.

Various additives and components have been used in drilling fluids of the prior art. Polysaccharides have been used as the basic means of viscosity control because of their desirable thixotropic characteristics. These materials are formed by the action of bacteria of the genus Xanthomonas, preferably Xanthomonas campestris, on carbohydrates such as glucose, fructose, sucrose and the like to produce a heteropolysaccharide. The preparation of polysaccharides useful in drilling fluids is well known and is described in the following U.S. Pat. Nos.:

| 3,000,790 | A. R. Jeanes etal | Sept. 19, 1961 |
| 3,020,206 | J. T. Patton etal | Feb. 6, 1962 |
| 3,243,000 | J. T. Patton etal | Mar. 29, 1966 |
| 3,319,715 | C. F. Parks | May 16, 1967 |
| 3,699,042 | W. C. Browning etal | Oct. 17, 1972 |

The use of lignosulfonates in drilling fluids as thinners or dispersants is also well known. They can be prepared by procedures described in Reissue U.S. Pat. No. RE 18,268; INDUSTRIAL AND ENGINEERING CHEMISTRY, Volume 31, No. 11, Nov. 1939, pp. 1331–35 and U.S. Pat. No. 3,699,042.

U.S. Pat. No. 3,699,042 described a drilling fluid in which the polysaccharide component is cross-linked with a complex formed by the reaction of a lignosulfonate and chrome sulfate, the chromium content of the complex being 4–10%. Numerous other patents, e.g. U.S. Pat. No. 3,243,000, also relate to the use of chromium to cross-link the polysaccharide. However, we have found that such fluids tend to permanently plug the formation to a significant extent.

SUMMARY OF THE INVENTION

The present invention relates to a multicomponent non-damaging drilling fluid. It contains a polysaccharide, a lignosulfonate, chrome sulfate, a basic metal compound to increase the pH and preferably also calcium carbonate of graded particle size distribution and starch. The fluid is characterized in that the polysaccharide is not cross-linked as in, e.g. U.S. Pat. No. 3,699,042, this result being achieved by controlling the amount of chromium in the composition to less than that required to initiate cross-linking. In a standard permeability test the fluid seals off the core immediately, usually in less than one pore volume, and upon backflushing the core 90% of the initial core permeability is obtained.

DESCRIPTION OF THE INVENTION

The polysaccharide component of the invention is any of those described previously. It can be synthesized in the manner disclosed in the specified references but is available commercially from a variety of sources. The amount used will normally be in the range of about ¼ to 4 pounds per barrel (ppb) of water. The water used in making up the drilling fluid of the invention will in most cases actually be sodium chloride brine since this is often available in the field but either water or brine is suitable. Various ions such as calcium will also usually be present in the water or brine. Usually the amount of polysaccharide will be ¼ to 3 ppb and preferably is ½ to 3 ppb. One barrel equals 42 gallons.

The lignosulfonate component can be any of those available commercially or can be made by known methods as in U.S. Pat. No. 3,699,042, U.S. Pat. No. 2,491,437, W. E. Barnes, issued Dec. 13, 1949 and many others. The commercially available materials are most usually the calcium salts, since these have been found the most generally satisfactory in oil field applications but other metal salts such as sodium are also suitable. The amount of the lignosulfonate will be about ½ to 5 ppb, usually 1.1 to 4 ppb, and is preferably about 2 ppb.

The chrome sulfate component can be any of those available commercially, the latter being usually sold as chrome alum and having the $Cr_{cd2}(SO_4)_3K_2SO_4\cdot 24H_2O$. It should have a basicity of one-third or less (see U.S. Pat. No. 3,699,042) but essentially all chrome sulfates sold for oil field use have this characteristic. Other metals of the same transition group such as iron, cobalt, etc. are equivalent to chromium but chrome sulfate is preferred because it gives the best results and is so readily available.

It is essential for the present purpose that the amount of chromium be insufficient to cause any significant cross-linking of the polysaccharide. An aqueous polysaccharide which is cross-linked with chromium is a considerably more damaging drilling fluid than our fluid which is not cross-linked. Lack of cross-linking is achieved by maintaining a relatively low amount of chromium in the fluid. As used herein the amount of chromium specified is by weight of the lignosulfonate and the chrome sulfate excluding the water of hydration in the latter. The percent chromium will be less than about 4% which as specified in U.S. Pat. No. 3,699,042 causes cross-linking. Usually it will be less than 2.5–3.0% and is preferably less than 1%. The actual quantity of the chrome sulfate will depend upon the amount of lignosulfonate, since the amount of chrome effective to cause cross-linking depends on the total amount of chrome sulfate and the lignosulfonate, but will be about 0.02 to 0.5 ppb. Normally it is 0.05 to 0.4 ppb and is preferably 0.1 to 0.3. It is believed that the chromium reacts with the lignosulfonate and above a certain threshold level (about 4%) initiates cross-linking. Lack of any significant cross-linking is demonstrated by comparing Fann viscosities at room temperature of an aqueous polysaccharide solution at the concentration to be used with the same solution containing the lignosulfonate and chrome sulfate. There will be no significant difference in the viscosities.

The calcium carbonate which is preferably included in the invention should be of graded particle size in order to help bridge the well bore surface quickly to minimize plugging of the formation. The absolute size of the calcium carbonate particles will depend on the size of the formation pores but experience has shown that the largest particle should be roughly half the diameter of the pore to be bridged, bridging occurring when a plurality of carbonate particles attempt to simultaneously enter the pore. In most cases calcium carbonate with a maximum size of about 400 microns is suitable although lower or higher sizes can also be used. Graded calcium carbonate is sold commercially as such as opposed to ungraded calcium carbonate. The ungraded material is usually specified as being less than 200 mesh and although there will naturally be some particle size variation in this material there is no attempt to include particles having a size distribution over substantially the entire range, i.e., 0–200 mesh. In the graded material if a plot is made of the weight percentage of particles which are finer than a specified micron size, plotting even ten percentage increments from 0 to 100 arithmetically and micron size logarithmically the curve obtained will not deviate greatly from a straight line. In other words the particles are distributed about uniformly over the whole range. It will also usually be found that the first 10% of the size range (i.e., 0–40 microns if the largest size is 400 microns) contains at least 10% by the particles, as does the next 15% of the size range, the next 25% and the last 50%. Two typical graded calcium carbonates suitable for the present purpose have the following size distribution although others are suitable.

| Weight Percent Finer Than | Particle Size in Microns | |
|---|---|---|
| | Product 1 (Max. 40 Microns) | Product 2 (Max. 400 Microns) |
| 10 | 1.8 | 2 |
| 20 | .4 | 5 |
| 30 | 5 | 10 |
| 40 | 6.5 | 19 |
| 50 | 8 | 31 |
| 60 | 10 | 50 |
| 70 | 13 | 80 |
| 80 | 17 | 125 |
| 90 | 25 | 220 |
| 100 | 40 | 400 |

The amount of graded calcium carbonate will vary but will usually be ½ to 75 ppb, more frequently ½ to 50 ppb, and is preferably in the range of ¾ to 50 ppb. It will be apparent that any other graded inert material could be used equivalently instead of calcium carbonate but the latter is preferred to e.g., barium sulfate (known as a weight agent) since when a formation is acidized with HCl any calcium carbonate is readily dissolved whereas barium sulfate is not.

The composition also contains a material which will raise the pH of the fluid to above 7 to prevent corrosion of borehole equipment. Preferably the pH is about 9–9.5. Magnesium oxide is preferred but other known materials such as NaOH can also be used. The amount of MgO will usually be 0.05–5 ppb, more frequently 0.05–2 ppb.

The composition preferably also contains starch which is preferably the pregelatinized oil field grade which has been treated with caustic so that it swells faster in aqueous solutions. The starch will normally be present in the amount of 0.1–5 ppb, preferably 0.2–1, more preferably about ½ ppb.

It will be apparent from the above that the fluid of the invention contains less than 5 ppb of the polysaccharide, the lignosulfonate and the chrome sulfate. The amount of polysaccharide will depend on the desired viscosity and the lignosulfonate and chrome sulfate are selected so as to not only prevent cross-linking of the polysaccharide but also to obtain the desired seal off of the borehole face and the desired return permeability as shown more clearly in the following examples.

The following examples illustrate the invention more specifically. Permeability tests are made as follows:

A 1 inch diameter by 2½ inch long core is mounted in the rubber sleeve of a standard core-holder assembly. The core is Berea sandstone unless otherwise specified. Pressure in excess of the maximum operating pressure is applied to the sleeve by the hydraulic pump. The pressure over-balance forces all flow to pass through the core, rather than around the edges. Nitrogen pressure is used to force 6% sodium chloride brine through the core (from right to left) until a steady flow rate is established. All brine flow is conducted at 25 to 50 p.s.i. differential pressure, depending on the permeability of the core. Lower pressures are used on higher permeability cores for convenience in obtaining good flow rates. All pressures herein are gauge pressure. The permeability of the core is calculated using Darcy's linear flow equation:

$$K = q \cdot \mu \cdot l / \Delta p \cdot a$$

where:
$K$ = permeability in Darcys
$q$ = flow rate in cc/sec
$\mu$ = viscosity of fluid in centipoises
$l$ = length of core in cm.
$\Delta p$ = differential pressure in atm.
$a$ = cross sectional area of core in square cm.

After the initial permeability has been established the test fluid is flowed into the left end of the core under a pressure of 500 p.s.i. Flow is continued for a period of 30 min. and the amount of the fluid passing through the core is recorded.

Following application of the test fluid, brine is again flowed through the core from right to left (backflush) under the same differential pressure as before —25 or 50 p.s.i. Brine flow is continued until a steady flow rate is obtained and the permeability is again calculated. Percent reduction in permeability caused by the test fluid is obtained by comparing the initial permeability with the return permeability.

The core may then be acidized by flowing acid (5 pore volumes, 15% HCl) through the core from left to right. Acid soluble components of the test fluid which may have penetrated the core are removed by this step. After acidizing, brine is again flowed through the core (right to left) to obtain a third permeability measurement. The improvement from acidizing is obtained by comparing the permeability before acid with the permeability after acid.

The pore volume of the core is determined from the weight of a brine of known density required to saturate the dried (at 225° F) core.

EXAMPLE I

A permeability test on a test fluid containing 1.5 ppb commercially available drilling fluid polysaccharide in 12% NaCl brine gave the following results: The polysaccharide used in all examples in Enjay Biopolymer 9700.

| Step | Cumulative Pore Volumes | Percent of Initial Permeability |
|---|---|---|
| 1. Permeability to brine (50 p.s.i.) | 25 | 100 |
| 2. Test Fluid | 26 | 5 |
|  | 28 | 3 |
|  | 31 | 2 |
| 3. Backflush (50 p.s.i.) | No flow— core plugged |  |

The above date show that 25 pore volumes of fluid (6% brine) were passed through the core to determine its initial permeability. Six pore volumes of the test fluid were then passed through the core and the permeability dropped to 2%. A good fluid will drop to 0% and will do so in less than 5 pore volumes, with 0% in about 1 pore volume or less being desired.

EXAMPLE II

Another test was made using 1.5 ppb of the same biopolymer and 10 ppb of graded calcium carbonate (to 400 microns) in 12% brine. It was hoped that the carbonate particles would prevent plugging of the core pores by the polysaccharide. Results are as follows:

| Step | Cumulative Pore Volumes | Percent of Initial Permeability |
|---|---|---|
| 1. Permeability to Brine (25 p.s.i.) | 30 | 100 |
| 2. Test Fluid | 32 | 0 |
| 3. Backflush (25 p.s.i.) | 40 | 9 |
|  | 60 | 24 |
|  | 80 | 32 |
|  | 100 | 35.5 |
|  | 119 | 36 |
| 4. Acidizing |  |  |
| 5. Backflush (25 p.s.i.) | 119 | 77 |

These results show that the addition of graded calcium carbonate has helped. Complete seal off is achieved and the core did not plug. However, the return permeability was only 35% of the initial and this required 79 pore volumes to achieve. Acidizing increased the return permeability to 77% but actually it is desired to get to 70–90% return permeability without acidizing and in less than 25 pore volumes, or to at least 65% in less than 15 pore volumes.

EXAMPLE III

This example shows the results obtained with a commercially available formulated drilling fluid. It contained 2 ppb of a cross-linked polysaccharide-chrome alum mixture known as XCFD sold by Imco Services Division of the Halliburton Company, 10 ppb calcium carbonate (ungraded), 7 ppb bentonite, 0.25 ppb NaOH and 5% diesel oil. Results are as follows:

| Step | Cumulative Pore Volumes | Percent of Initial Permeability |
|---|---|---|
| 1. Permeability to Brine (50 p.s.i.) | 24 | 100 |
| 2. Test Fluid | 27 | 0 |
| 3. Backflush (50 p.s.i.) | 30 | 6 |
|  | 40 | 20 |
|  | 60 | 37.5 |
|  | 80 | 43 |
|  | 90 | 43 |
| 4. Acidize |  |  |
| 5. Backflush (50 p.s.i.) | 90 | 54 |

These results show, in comparison with later examples that cross-linking the polysaccharide does not help, in fact reduces, seal off and return permeability.

EXAMPLE IV

A drilling fluid of the invention was made up from 12% brine and 1.08 ppb polysaccharide, 2.4 ppb calcium lignosulfonate, 0.6 ppb starch, 0.18 ppb chrome alum, 1.24 ppb magnesium oxide, 11.5 ppb ground limestone graded to maximum size of 420 microns. The ingredients were all mixed together dry and then added to the brine at room temperature with stirring. The pH of the final fluid was about 9.5. The amount of chromium based on the lignosulfonate and chrome alum was 0.7%. Test results are as follows:

| Step | Cumulative Pore Volumes | Percent of Initial Permeability |
|---|---|---|
| 1. Permeability to Brine (25 p.s.i.) | 35.5 | 100 |
| 2. Test Fluid | 35.5 | 0 |
| 3. Backflush (25 p.s.i.) | 40 | 65 |
|  | 70 |  |
|  | 50 | 82 |
|  | 60 | 88 |
|  | 70 | 90 |
|  | 80 | 91 |

These results show the excellent characteristics of a fluid of the invention. Seal off of the core occurred with no measurable volume of the test fluid and in addition 90% of the initial permeability was regained in 25 pore volumes backflush and 70% regained in only about 6.5 pore volumes. No acidizing was necessary because of the high return permeability.

EXAMPLE V

This example shows that weighting agents can also be added to the drilling fluids of the invention. These agents are inert materials used to raise the density of the fluid. A fluid was made up containing the following ppb of the specified ingredients, in 12% brine; 0.9 polysaccharide, 2.0 calcium lignosulfonate, 0.5 starch, 0.15 chrome alum, 0.2 MgO, 1.25 calcium carbonate graded to maximum size of 44 microns. In addition 100 ppb ungraded calcium carbonate was added to increase the density to 10.4 lbs/gal. Results are as follows:

| Step | Cumulative Pore Volumes | Percent of Initial Permeability |
|---|---|---|
| 1. Permeability to Brine (25 p.s.i.) | 22 | 100 |
| 2. Test Fluid | 24 | 0 |
| 3. Backflush (25 p.s.i.) | 30 | 60 |
|  | 40 | 72 |
|  | 60 | 80 |
|  | 80 | 84 |
| 4. Acidize |  | 100 |
| 5. Backflush (25 p.s.i.) | 80 |  |

These results show that $CaCO_3$ weighting agent has only a slight adverse effect.

EXAMPLE VI

A fluid was made up the same as Example V except that barium sulfate was the weighting material. The results below show that most of the non-damaging character is also retained with this weighting material. Acidizing the core does not effect return permeability mainly because of the insoluble character of $BaSO_4$.

| Step | Cumulative Pore Volumes | Percent of Initial Permeability |
|---|---|---|
| 1. Permeability to Brine (25 p.s.i.) | 22 | 100 |
| 2. Test Fluid | 24 | 0 |
| 3. Backflush (25 p.s.i.) | 30 | 67 |
|  | 40 | 76 |
|  | 50 | 77 |
|  | 66 | 77 |
| 4. Acidize |  |  |
| 5. Backflush (25 p.s.i.) | 70 | 80 |
|  | 72 | 83 |
|  | 100 | 83 |

EXAMPLE VII

This example shows the results of the drilling fluid of the invention after it had been first used under field conditions to determine its commercial suitability. The fluid contained (in ppb) in a 10 lbs/gal NaCl brine, 1.08 polysaccharide, 2.4 calcium lignosulfonate, 0.6 starch, 0.18 chrome alum, 0.24 MgO, 1.5 graded calcium carbonate with maximum particle size of 44 microns, 0.12 Dowcide G (a bactericide), weighted to 11.5 lbs/gal with a mixture of $CaCO_3$ ungraded and $BaSO_4$.

| Step | Cumulative Pore Volumes | Percent of Initial Permeability |
|---|---|---|
| 1. Permeability to Brine (25 p.s.i.) | 36 | 100 |
| 2. Test Fluid | 37 | 0 |
| 3. Backflush (25 p.s.i.) | 40 | 60 |
|  | 50 | 74 |
|  | 60 | 80 |
|  | 70 | 82 |
|  | 80 | 83 |
|  | 86 | 83 |

These results show the fluid retains its non-damaging characteristics even after field use in which it becomes contaminated with drill solids.

EXAMPLE VIII

This example shows that in the drilling fluid of this invention, the polysaccharide, is not cross-linked with the chromium.

Fann viscosities were determined on two compositions, one (A) being 1.08 ppb polysaccharide, the other (B) being the drilling fluid of our invention shown in Example III. The results are as follows:

| RPM | FANN VISCOSITY FLUID A | FLUID B |
|---|---|---|
| 3 | 2.5 | 2.5 |
| 6 | 3.5 | 3.5 |
| 100 | 9.5 | 9.5 |
| 200 | 12.0 | 12.5 |
| 300 | 14.0 | 14.5 |
| 600 | 18.5 | 20.0 |

The data show that there is no significant cross-linking in the present invention. The slight difference at the higher RPMs is due to the other ingredients in Fluid B not present in Fluid A. FIG. 1 of U.S. Pat. No. 3,699,042 is a good illustration of the magnitude of the difference in Fann viscosities achieved by cross-linking. This figure shows the difference to be a factor of 2.5 to 3.

The invention claimed is:
1. Method of drilling a well in an underground formation which comprises circulating in said well, while drilling, a non-damaging aqueous drilling fluid consisting essentially of
   a. a polysaccharide obtained by the action of bacteria of the genus Xanthomonas on a carbohydrate, said polysaccharide being substantially non-cross-linked and the amount thereof being about ¼ to 4 pounds per barrel of said solution,
   b. a lignosulfonate in an amount of about ½ to 5 pounds per barrel,
   c. chrome sulfate in an amount of about 0.02 to 0.5 pounds per barrel, the amount of chrome being less than 4% by weight of the chrome sulfate and lignosulfonate,
   d. a basic metal compound in an amount to yield a solution pH of at least 7,
   e. calcium carbonate in an amount of ½ to 75 pounds per barrel, said calcium carbonate being graded such that at least about 10% of the particles are contained in each of the first 10%, beginning with zero, of the size range, the next 15%, the next 25% and the next 50%.
2. Method according to claim 1 wherein the amounts of ingredients (a), (b), (c) and (e) are about ¼ to 4 pounds per barrel, 1.1 to 4 pounds per barrel, 0.05 to 0.5 pounds per barrel and ½ to 50 pounds per barrel respectively.
3. Method according to claim 1 wherein the amounts of ingredients (a), (b), (c) and (e) are about ½ to 3, 2, 0.1 to 0.3 and ¾ to 50 respectively and in pounds per barrel.
4. Method according to claim 1 wherein the aqueous solution also contains starch in the amount of 0.1 to 5 pounds per barrel.

5. Method according to claim 1 wherein said aqueous solution achieves, in the standard core permeability test, essentially complete seal off in less than five pore volumes of solution and on backflush without acidizing at least 70% of the initial permeability in less than 25 pore volumes of solution.

6. Method of drilling an underground well which comprises circulating in the well, while drilling, a non-damaging aqueous drilling fluid consisting essentially of 1–15 pounds per barrel of fluid of a mixture of about 0.02 to 5 pounds per barrel of each of the following
   a. a substatially non-crosslinked polysaccharide produced by the action of the genus Xanthomanas on a carbohydrate,
   b. a lignosulfonate,
   c. a chrome sulfate,
the amount of lignosulfonate and chrome sulfate being such that the viscosity of said mixture is not substantially different than an aqueous solution containing the same pounds per barrel of said polysaccharide as in said mixture, wherein the amount of chromium is less than 4% based on the total weight of chrome sulfate and lignosulfonate.

7. Method according to claim 6 wherein the amount of chromium is less than 2.5% based on the total weight of chrome sulfate and lignosulfonate.

8. Method according to claim 6 wherein the amount of (a), (b) and (c) is about, respectively and in pounds per barrel of fluid; ½ to 3, 2, and 0.1 to 0.3.

9. Method according to claim 6 wherein said fluid, in the standard core permeability test, exhibits essentially complete seal off in less than 5 pore volumes of fluid and, on backflush, regains at least 70% of the initial permeability in less than 25 pore volumes of fluid.

10. Method according to claim 9 wherein the amount of (a), (b) and (c) is, respectively, ¼ to 4 pounds per barrel, ½ to 5 pounds per barrel and 0.02 to 0.5 pounds per barrel.

11. Method according to claim 9 wherein the amount of (a), (b) and (c) is about, respectively: ½ to 3 pounds per barrel, 2, and 0.1 to 0.3 pounds per barrel.

12. Method according to claim 9 wherein said seal off occurs in about one pore volume and said regaining is at least 65% in less than about 15 pore volumes of fluid.

13. Method according to claim 12 wherein on backflush said fluid regains about 90% of the initial permeability.

14. Method according to claim 7 wherein said fluid also contains graded calcium carbonate in an amount effective to reduce the pore volumes of fluid required to achieve seal off.

15. Method according to claim 14 wherein the calcium carbonate particle size is distributed so that at least about 10% of the particles are contained in each of the first 10%, beginning with zero, of the size range, the next 15%, the next 25% and the next 50%.

16. Method according to claim 14 wherein said fluid also contains 0.1 to 5 pounds per barrel of fluid of starch.

17. Method of drilling an underground well which comprises circulating in the well, while drilling, a non-damaging drilling fluid consisting essentially of 1–15 pounds per barrel of fluid of a mixture of about 0.02 to 5 pounds per barrel of each of the following
   a. a substantially non-crosslinked polysaccharide produced by the action of the genus Xanthomanas on a carbohydrate,
   b. a lignosulfonate,
   c. a chromium sulfate,
the amount of lignosulfonate and chromium sulfate being such that the viscosity of said mixture is not substantially different than an aqueous solution containing the same pounds per barrel of said polysaccharide as in said mixture wherein the amount of chromium is less than 4% based on the total weight of the chrome sulfate and liqnosulfonate and wherein said chromium sulfate is at least partially reacted with the lignosulfonate.

18. Method according to claim 17 wherein the amount of chromium is less than 2.5% based on the total weight of chromium sulfate and lignosulfonate.

* * * * *